Aug. 3, 1965   F. J. LANSING   3,198,689
GARNISHING BEAD
Filed Jan. 29, 1962

INVENTOR.
FREDERICK J. LANSING
BY Cumpston & Shaw
HIS ATTORNEYS.

3,198,689
GARNISHING BEAD
Frederick J. Lansing, Rochester, N.Y., assignor to The Schlegel Manufacturing Company, Rochester, N.Y., a corporation of New York
Filed Jan. 29, 1962, Ser. No. 169,465
7 Claims. (Cl. 161—100)

This invention relates to trimming or garnishing beads for fixedly embracing and enclosing the structural edges of bodies, such, for example, as the edges of metal panels or plates of doors, door frames, or other projecting edge parts of the interiors of automobile bodies and the like, one object being to provide an improved bead having a more simple, inexpensive, practical and efficient construction.

Another object is the provision of such a bead in a flexible construction adapted to be readily bent to closely conform to and fit structural edges of varying curvature.

Another object is to supply a bead of the above character requiring merely to be fitted to a structural edge to be covered and having efficient, self-contained means for securely locking it in place on the edge.

Still another object is to provide a bead having the above advantages and which is inexpensive to manufacture, attractive in appearance and durable in use.

To these and other ends the invention resides in certain improvements and combinations of parts, all as will be hereinafter more fully described, the novel features being pointed out in the claims at the end of the specification.

Figure 1:
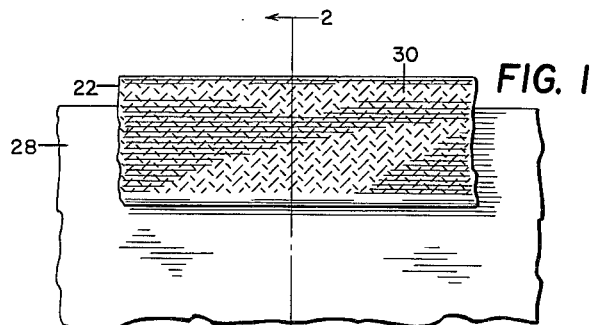
FIG. 1 is a fragmentary side elevation of a portion of a garnishing bead embodying the present invention and shown applied to a structural edge.
Figure 2:
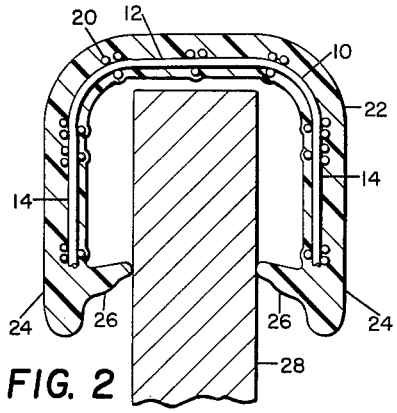
FIG. 2 is an enlarged, sectional view on the line 2—2 in FIG. 1.
Figure 3:
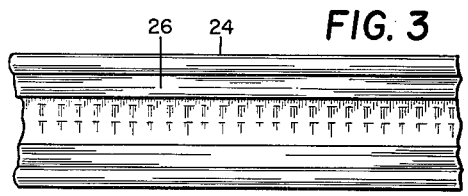
FIG. 3 is a view of the interior of the bead.

The invention is disclosed herein, by way of illustration, in an embodiment of the bead at present preferred, comprising a bendable supporting frame 10 of substantially channel or U-shape in transverse section, as shown in FIG. 2, having a base 12 and opposite side flanges 14. This frame is formed by lengths of metal wires 16 extending transversely of the frame and in spaced relation with one another longitudinally thereof, as shown. These lengths of wire are preferably provided by a continuous wire looped as at 18 (FIG. 4) to form transversely extending spaced lengths 16. The wire is preferably of tempered carbon steel having a tensile strength between 125,000 and 155,000 p.s.i. and a diameter of about 0.030 inch and so of sufficient rigidity to jointly maintain the channel shape of the bead, subject to bending of the wires individually, as shown in FIG. 5, to enable the channel as a whole to be readily bent to conform to and fit differently curved edges of structural flanges. That is to say that the multiplicity of wires, acting in unison, maintain the channel shape of the bead and support the clamping fins hereafter described, while the individual wire lengths yield sufficiently to afford the flexibility of the channel as a whole shown in FIG. 5.

Figure 4:
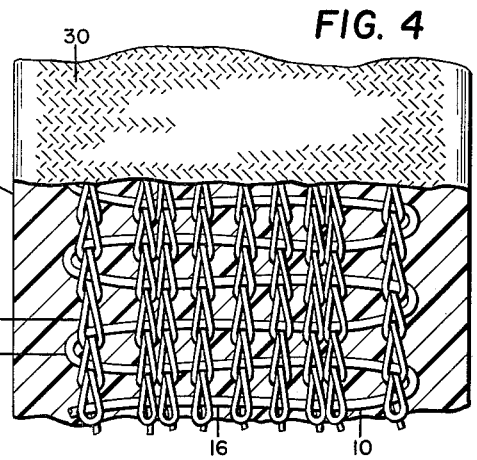
FIG. 4 is an enlarged fragmentary plan view, partly in section, showing a portion of the bead in flat condition before being bent into channel shape.
Figure 5:
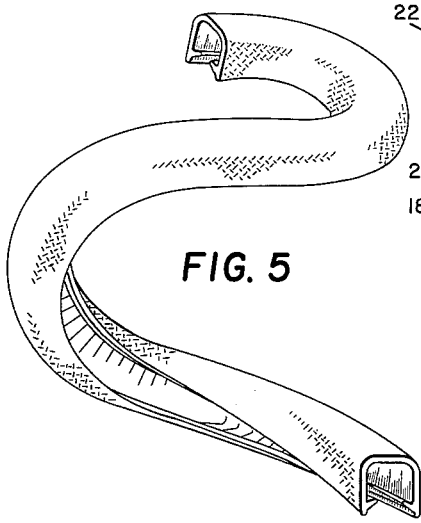
FIG. 5 is a perspective view of a length of the bead showing its flexible character.

The wire lengths 16 are preferably stayed and maintained in their spaced relation with one another by interweaving with them a plurality of strands 20 of material, as shown in FIGS. 2 and 4. Such strands are preferably interwoven adjacent the wire loops at the edges of the frame and a plurality of such strands are interwoven through the central portion of the frame, as shown. The material of the strands may be cotton, or fiberglass, or light wire, so as to maintain the spaced lengths of the frame without interfering materially with its flexibility.

The frame 10 so formed has both of its side faces and its edges covered by a coating of a plastic material 22, applied to the frame by a known and suitable extrusion process and apparatus. The coating is preferably somewhat thicker on the exterior than on the interior face of the frame, as shown, for better protection against external abrasion. The coating is extended beyond the outer edges of the frame flanges and provided with thickened edge portions 24 formed with fins 26 extending longitudinally of the frame and projecting obliquely inwardly of the frame and toward its base, as shown, for the purpose hereafter described.

Coating 22 is preferably composed of an elastomeric or plastic material such as plasticized vinyl resin, rubber, neoprene or the like, having the flexibility and resilience requisite to its described functions. After such coating of the frame in flat condition, as shown in FIG. 4, it is bent and formed into a substantially channel or U-shape, as shown in FIG. 2. The fins 26 are thus disposed for oblique engagement with the opposite faces of the structural flange 28 (FIG. 2). The channel so formed is readily pressed down over the free edge of the structural flange 28, the fins 26 being slightly deflected inwardly and maintained in closely fitting engagement with the faces of the structural flange. In the application of any force tending to remove the bead from the flange, the resulting frictional engagement of the fins 26 with the flange tends to swing the fins inwardly into a more nearly perpendicular engagement with the flange, thereby causing them to tightly grip it and securely resist removal of the bead, the fins being firmly supported by the resistance of the frame flanges against deviation from their channel shape.

Before the coated frame is formed into its channel shape, and while the coating is in a suitably soft condition, it is preferably embossed by engraved roller means to produce an impression 30 simulating a woven fabric covering material of pleasing appearance.

The invention thus provides a garnishing or trimming bead of the character described in a relatively simple contruction comprising but few parts adapted to be manufactured in quantity by a relatively inexpensive apparatus and method. The bead is readily applied to a structural edge by pressing it to engage and enclose the edge with the self-clamping function described above. The looped arrangement of the wires and the flexible coating afford a flexibility of the bead as a whole which adapts it for application to the varibly curved edges of a structural flange. The coating 22 provides a high degree of resistance to scuffing or abrasion so that the bead is durable in use. It may be made in various colors and the embossing of its surface with the pattern of a woven fabric covering affords a pleasing and attractive appearance.

It will thus be seen that the invention accomplishes its objects and while it has been herein disclosed by reference to the details of a preferred embodiment, it is to be understood that such disclosure is intended in an illustrative, rather than a limited sense, as it is contemplated that various modifications in the construction and arrangement of the parts will readily occur to those skilled in the art, within the spirit of the invention and the scope of the appended claims.

I claim:

1. A garnishing bead adapted to be immovably clamped and supported on the edge of a body flange to enclose and ornamentally trim the same comprising bendable supporting frame of metallic material of substantially U-shape in transverse section with a base and opposite side flanges for embracing and enclosing the edge of said body flange, and a coating of flexible, resilient plastic material covering both sides and the edges of said frame flanges, said coating being formed adjacent the edges of said frame flanges with resilient and compressible fins extending longitudinally of said frame and adapted to project obliquely inwardly of said frame and toward said base thereof for contact with opposite side faces of said body flange to resist removal of said bead therefrom by compressive wedging engagement therewith.

2. A garnishing bead as specified in claim 1 in which said frame is formed by metal wires extending in spaced relation with one another transversely of said frame.

3. A garnishing bead as specified in claim 1 in which said frame comprises a metal wire looped to form lengths extending transversely and spaced from one another longitudinally of said frame.

4. A garnishing bead as specified in claim 3 comprising a plurality of strands of material extending longitudinally of said frame and interwoven with said wire lengths to maintain the spacing thereof from one another.

5. A garnishing bead adapted to be immovably clamped and supported on the edge of a structural body flange to enclose and ornamentally trim the same comprising a bendable supporting frame of substantially U-shape in transverse section with a base and opposite side flanges for embracing and enclosing the edge of said body flange, said frame being formed by metal wires extending in spaced relation with one another transversely of said frame, a plurality of strands of material extending longitudinally of said frame and interwoven with said wires to maintain the spaced relation thereof, and a coating of flexible resilient plastic material covering both sides and the flange edges of said frame, said coating being formed at the edges of said frame flanges with resilient and compressible fins extending longitudinally of said frame and adapted to project obliquely inwardly of said frame and toward said base thereof for contact with opposite side faces of said body flange to resist removal of said bead therefrom by compressive wedging engagement therewith.

6. A garnishing bead adapted to be immovably clamped and supported on the edge of a structural body flange to enclose and ornamentally trim the same comprising a bendable supporting frame of substantially U-shape in transverse section with a base and opposite side flanges for embracing and enclosing the edge of said body flange, said frame being formed by a metal wire looped to form lengths extending transversely and spaced from one another longitudinally of said frame, and a coating of flexible, resilient plastic material covering both sides and the edges of said frame flanges, said coating being extended beyond the edges of said frame flanges and provided with thickened edge portions formed with resilient and compressible fins extending longitudinally of said frame and adapted to project obliquely inwardly of said frame and toward said base thereof for contact with opposite side faces of said body flange to resist removal of said bead therefrom by compressive wedging engagement therewith.

7. A garnishing bead adapted to be immovably clamped and supported on the edge of a structural body flange to enclose and ornamentally trim the same comprising a bendable supporting frame of substantially U-shape in transverse section with a base and opposite side flanges for embracing and enclosing the edge of said body flange, said frame being formed by a metallic wire looped to form lengths extending transversely and spaced from one another longitudinally of said frame, and a coating of flexible, resilient plastic material covering both sides and the edges of said frame flanges, said coating being formed at the edges of said frame flanges with resilient and compressible fins extending longitudinally of said frame and adapted to project obliquely inwardly of said frame and toward said base thereof for contact with opposite side faces of said body flange to resist removal of said bead therefrom by compressive wedging engagement therewith, the outer coated surfaces of said bead being embossed to simulate a woven fabric covering material.

References Cited by the Examiner

UNITED STATES PATENTS

| | | | |
|---|---|---|---|
| 2,954,310 | 9/60 | Truesdell | 154—43 |
| 3,091,821 | 6/63 | Cook | 20—74 |

FOREIGN PATENTS 803,141  10/58  Great Britain.

EARL M. BERGERT, *Primary Examiner.*